United States Patent [19]
Yamaoka et al.

[11] Patent Number: 5,133,574
[45] Date of Patent: Jul. 28, 1992

[54] VARIABLE DAMPING CHARACTERISTICS SUSPENSION SYSTEM FOR AUTOMOTIVE SUSPENSION SYSTEM WITH VARIABLE DAMPING CHARACTERISTICS SHOCK ABSORBER WITH INPUT VIBRATION FREQUENCY DEPENDENT VARIATION CHARACTERISTICS

[75] Inventors: Fumiyuki Yamaoka; Shinobu Kakizaki; Shigeru Kikushima, all of Atsugi, Japan

[73] Assignee: Atsugi Unisia Corporation, Japan

[21] Appl. No.: 436,030

[22] Filed: Nov. 14, 1989

[30] Foreign Application Priority Data

Nov. 18, 1988 [JP] Japan ................................ 63-291708

[51] Int. Cl.⁵ ........................................... B60G 17/015
[52] U.S. Cl. ..................................................... 280/707
[58] Field of Search .................. 280/707; 364/424.05, 364/702, 714, 840, 6.1, 6.12; 188/299

[56] References Cited

U.S. PATENT DOCUMENTS

| | | | |
|---|---|---|---|
| 4,579,366 | 4/1986 | Doi et al. ............................. | 280/707 |
| 4,674,767 | 6/1987 | Kuroki et al. ........................ | 280/707 |
| 4,678,203 | 7/1987 | Röhner ................................ | 267/64.28 |
| 4,696,489 | 9/1987 | Fujishiro et al. .................... | 280/707 |
| 4,729,459 | 3/1988 | Inajaki ................................. | 280/703 |
| 4,765,648 | 8/1988 | Mander et al. ...................... | 280/707 |
| 4,961,483 | 10/1990 | Yamaoka et al. . | |
| 5,016,908 | 5/1991 | Athanas et al. ..................... | 280/714 |
| 5,020,825 | 6/1991 | Lizell .................................. | 280/707 |
| 5,054,809 | 10/1991 | Yamaoka ............................ | 280/707 |

Primary Examiner—Charles A. Marmor
Assistant Examiner—Karin Tyson
Attorney, Agent, or Firm—Ronald P. Kananen

[57] ABSTRACT

An automotive suspension system includes means for monitoring bounding and rebounding strokes for producing a stroke indicative signal, and means for detecting frequency of bounding and rebounding strokes based on the stroke indicative signal. The suspension characteristics are hardened when the detected frequency is lower than a predetermined stroke frequency threshold for providing higher driving stability. On the other hand, when the detected stroke frequency is higher than or equal to the stroke frequency threshold, the suspension characteristics are switched between harder suspension characteristics and softer suspension characteristics depending upon stroke position for absorbing vibration energy and assuring riding comfort.

15 Claims, 7 Drawing Sheets

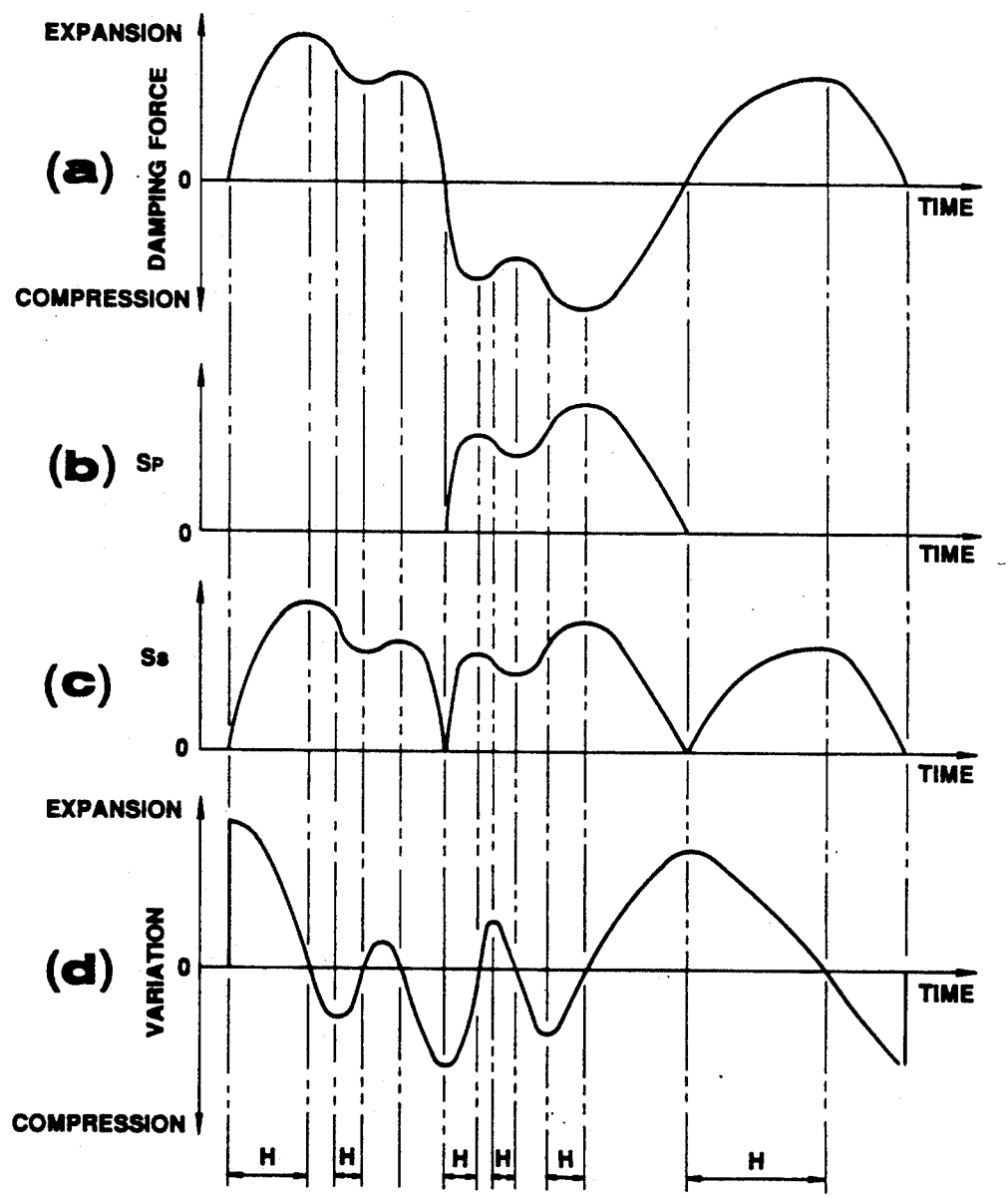

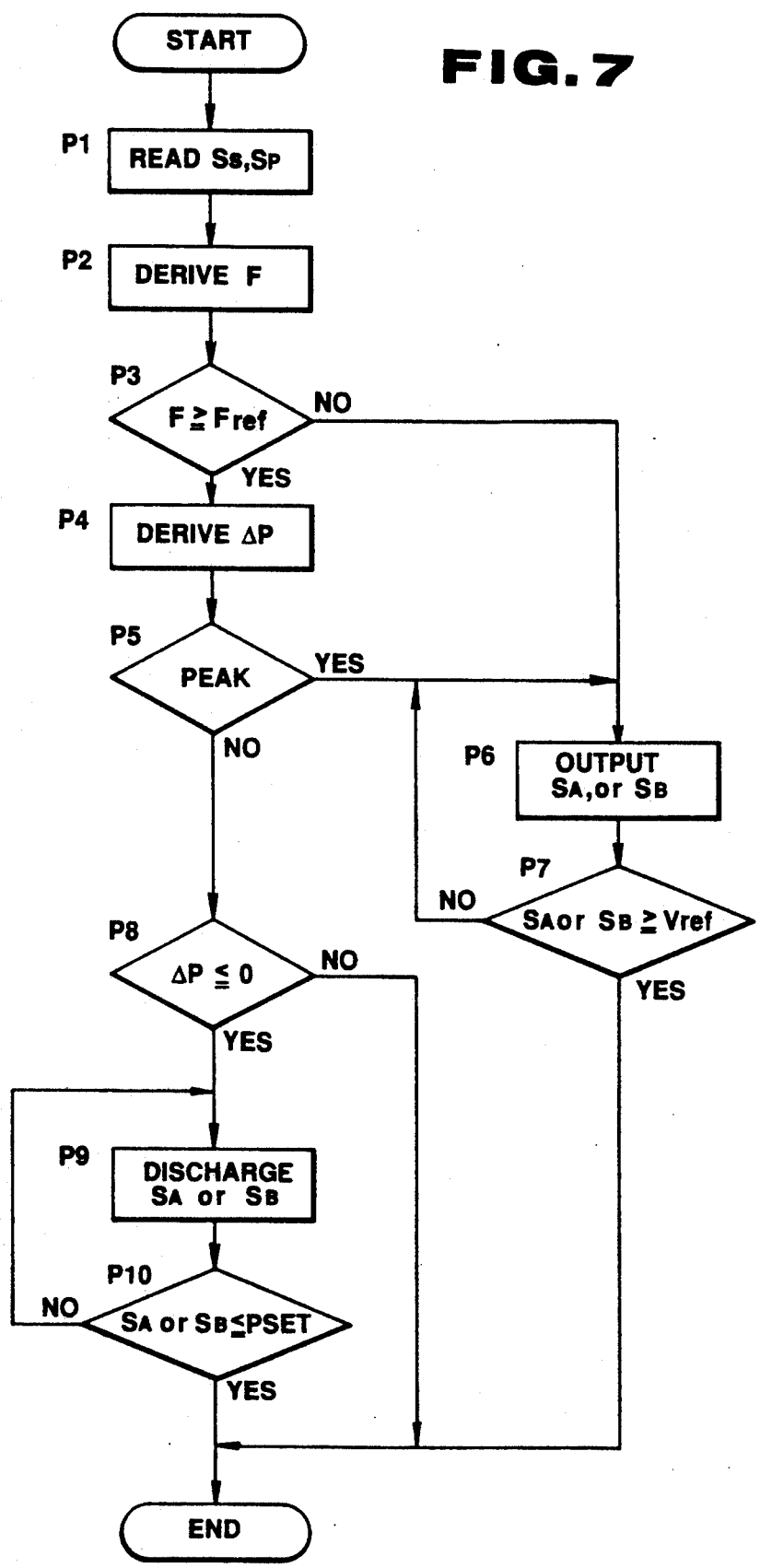

VARIABLE DAMPING CHARACTERISTICS SUSPENSION SYSTEM FOR AUTOMOTIVE SUSPENSION SYSTEM WITH VARIABLE DAMPING CHARACTERISTICS SHOCK ABSORBER WITH INPUT VIBRATION FREQUENCY DEPENDENT VARIATION CHARACTERISTICS

BACKGROUND OF THE INVENTION

1. Field of the Invention

The present invention relates generally to an automotive suspension system which has variable suspension characteristics depending upon the vehicle driving condition in order to achieve both vehicle driving stability and riding comfort. More specifically, the invention, relates to an automotive suspension system which discriminate vibration caused due to vehicle body attitude change from vibration caused due to vibration, such as road shock, input through a vehicular wheel in order to appropriately adjust damping characteristics of the suspension system.

2. Description of the Background Art

In the recent automotive technologies, respective automotive components have been required to exhibit high performance and high response. In case of a suspension system, a high level of riding comfort and driving stability has been required. In order to achieve both high level riding comfort and high level driving stability, a high response against vibration input to the suspension system has been required.

One of the typical variable damping force suspension systems has been disclosed in Japanese Patent First (unexamined) Publication (Tokkai) Showa 61-85210. In the disclosed system, a piezoelectric element is disposed in each shock absorber in each suspension system for detecting variation of fluid pressure in the shock absorber. A control unit is provided for receiving an input indicative of the fluid pressure provided from the piezoelectric element. The control unit outputs a controlled voltage to the piezoelectric element for switching an operation mode of the shock absorber at least between a SOFT mode in which a smaller damping force is to be generated in response to vibration input and a HARD mode in which a greater damping force is to be generated in response to vibration input.

In general, the control unit is responsive to low frequency input vibration which induces an attitude change of the vehicle body to switch the operational mode of the shock absorber into a HARD mode for a given period of time. While the shock absorber is maintained at the HARD mode, the piezoelectric element maintains operation as an actuator for maintaining the HARD mode operation of the shock absorber. Such manner of control of suspension characteristics may be effective in terms of suppression of vehicular attitude change, such as rolling and/or pitching. However, on the other hand, even in response to road shock input from a vehicular wheel, it is likewise desirable to adjust the suspension characteristics depending upon the nature of road shock in order to satisfactorily achieve both riding comfort and driving stability. Therefore, the prior proposed variable damping characteristic suspension systems for automotive vehicle are not at all satisfactory.

Furthermore, in the prior proposed system, while it is active as the actuator, the piezoelectric element can not monitor fluid pressure.

In the modern technology of suspension control, it has been considered desirable that varying the damping characteristics of a shock absorber between a piston compression stroke in response to a bounding motion between the vehicle body and a road wheel and a piston expansion stroke in response to a rebounding motion between the vehicle body and the road wheel in order to obtain better vibration stabilizing performance. Therefore, it is desirable to adjust the damping characteristics of the shock absorber depending upon the mode of piston action. In order to realize this, it is essential to detect the piston action mode on the basis of a variation of the fluid pressure in the shock absorber. However, as set forth above, the piezoelectric element is held inoperative as the fluid pressure sensing element while the shock absorber is maintained at the HARD mode.

This may cause a problem in damping shocks. For example, when the damping characteristic in the HARD mode is set to generate a relatively great damping force in response to vibration input, a damping force generated in response to piston compression mode action can amplify the input vibration. This tendency may be significant for the second and subsequent vibration cycles. This clearly degrades the vibration stabilizing performance of the vehicle to provide a rough ride feeling.

In addition, the prior proposed suspension system operates substantially in a passive manner to detect the input vibration based on variation of fluid pressure in the shock absorber. Namely, until the vehicle driving condition is changed to require switching of suspension characteristics, the suspension will never operate to switch suspension characteristics. Therefore, when a criterion of the fluid pressure to switch the suspension mode from a SOFT mode to a HARD mode is set at a relatively high value in order to provide better riding comfort, the switch from the SOFT mode to the HARD mode tends to delay to cause bottoming due to low response characteristics particularly at the initial stage of switching of the suspension mode.

SUMMARY OF THE INVENTION

Therefore, it is an object of the present invention to provide a variable damping characteristic suspension system which can solve the problem in the prior art and thus achieve both riding comfort and driving stability at a satisfactorily high level.

In order to accomplish the aforementioned and other objects, an automotive suspension system, according to the present invention, includes means for monitoring bounding and rebounding strokes for producing a stroke indicative signal, and means for detecting frequency of the bounding and rebounding stroke based on the stroke indicative signal. The suspension characteristics are hardened when the detected frequency is lower than a predetermined stroke frequency threshold for providing higher driving stability. On the other hand, when the detected stroke frequency is higher than or equal to the strike frequency threshold, the suspension characteristic is switched between harder suspension characteristic and softer suspension characteristics depending upon stroke position for absorbing vibration energy and whereby assuring riding comfort.

According to one aspect of the invention, an automotive suspension system comprises:

a suspension mechanism disposed between a vehicle body and a suspension member rotatably supporting a road wheel, the suspension mechanism including a shock absorber damping relative movement between the vehicle body and the suspension member, the shock absorber being operative in a shock absorbing mode for absorbing vibration energy and a vibration suppressing mode for resisting against relative motion of the vehicle body and the suspension member;

a sensor means for monitoring relative position of the vehicle body and the suspension member for producing a sensor signal representative of bounding and rebounding motion stroke;

a controller receiving the sensor signal for discriminating input vibration mode between a low frequency mode and a high frequency mode which switches across a predetermined vibration frequency criterion, based on frequency of the bounding and rebounding motion, and deriving a suspension control signal ordering the vibration suppressing mode operation of the shock absorber when the low frequency mode vibration is detected, and deriving the control signal selectively ordering the shock absorbing mode and the vibration suppressing ode operations depending upon the relative stroke position of the vehicle body and the suspension member. In the preferred construction, the shock absorber includes:

a cylinder tube connected to one of the vehicle body and the suspension member and defining an internal space, a piston disposed within the internal space for dividing the internal space into first and second chambers and connected to the other of the vehicle body and the suspension member for relative movement with respect to the cylinder tube, the first and second chambers being filled with a working fluid;

a fluid communication means for establishing fluid communication between the first and second chambers with a limited fluid flow rate for generating a damping force against relative motion between the piston and the cylinder tube;

a valve means associated with the fluid communication means for controlling flow restriction of the fluid communication means, the valve means being variable of flow restriction characteristics for varying damping characteristics of the shock absorber; and an actuation means, associated with the valve means and responsive to a control signal, for controlling the valve means for adjusting flow restriction characteristics according to the control signal.

The sensor means comprises a piezoelectric means producing the sensor signal having a magnitude which is variable depending upon the working fluid pressure exerted thereon. The piezoelectric means may further serve as the actuating means.

According to another aspect of the invention, an automotive suspension system comprises:

a suspension mechanism disposed between a vehicle body and a suspension member rotatably supporting a road wheel, the suspension mechanism including a shock absorber damping relative movement between the vehicle body and the suspension member, the shock absorber having variable damping characteristics at least between a harder first characteristic and a softer second characteristic;

a sensor means for monitoring relative position of the vehicle body and the suspension member for producing a sensor signal representative of bounding and rebounding motion stroke;

a controller receiving the sensor signal for discriminating input vibration mode between a low frequency mode and a high frequency mode which switches across a predetermined vibration frequency criterion, based on frequency of the bounding and rebounding motion, deriving a suspension control signal ordering the first characteristics of the shock absorber when the low @frequency mode vibration is detected, and deriving the control signal for selectively ordering the first and second characteristics depending upon the relative stroke position of the vehicle body and the suspension member.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 6 is a timing chart showing variation of suspension mode in relation to variation of damping force to be generated in the shock absorber;

FIG. 7 is a flowchart showing the preferred process of suspension control to be performed in the preferred embodiment of the suspension system.

DESCRIPTION OF THE PREFERRED EMBODIMENT

Figure 1:
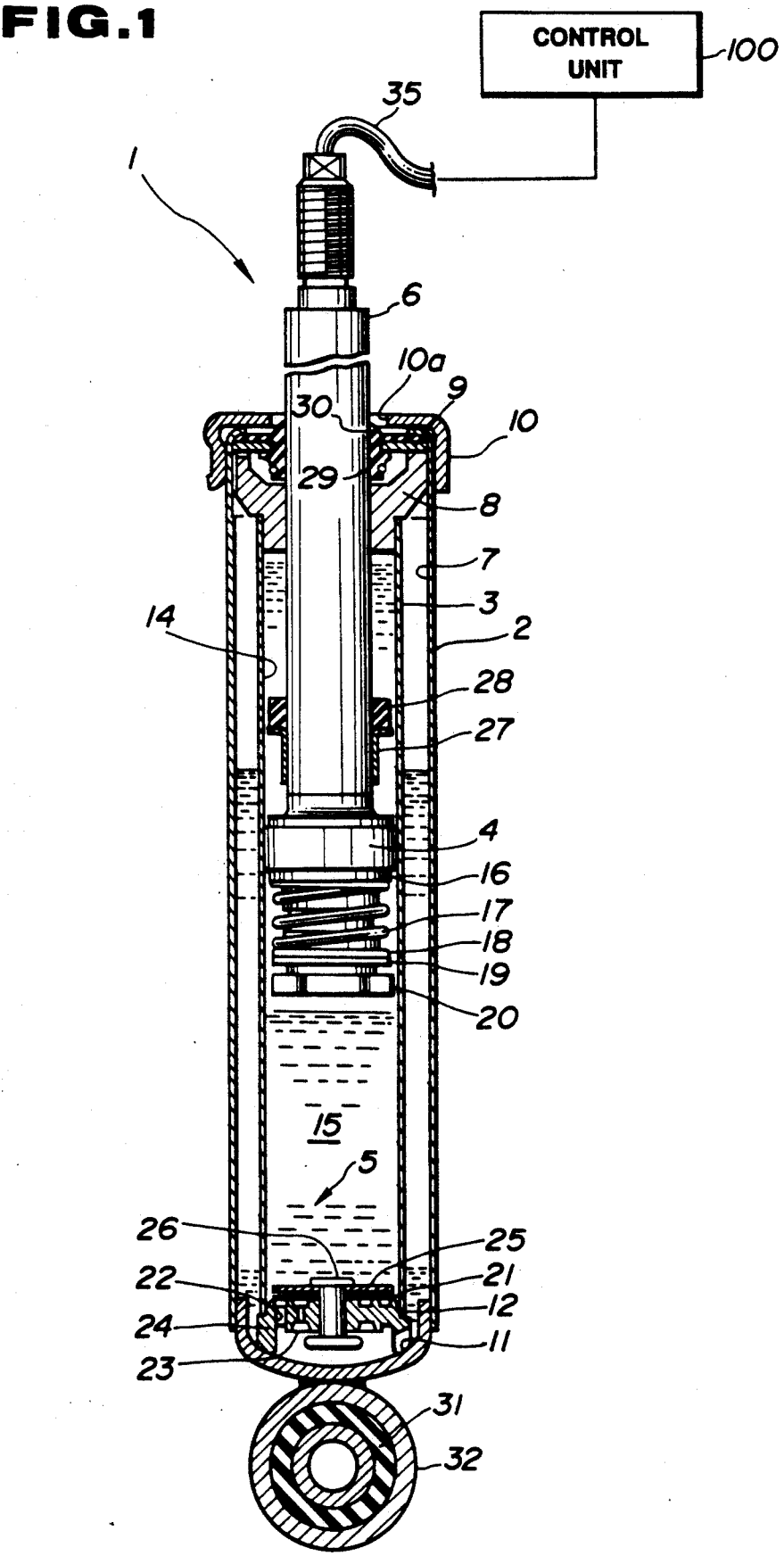
FIG. 1 is a section of preferred embodiment of a variable damping force shock absorber according to the present invention, which is associated with a control unit implementing a preferred process of suspension control.

Referring now to the drawings, particularly to FIG. 1, the preferred embodiment of a shock absorber, according to the present invention, serves as a principal component of the preferred embodiment of an automotive suspension system, according to the invention. The shown shock absorber 1 comprises a double action type shock absorber having variable damping characteristics. The shock absorber 1 has inner and outer cylinder tubes 3 and 2. The inner and outer cylinders 3 and 2 are arranged in a coaxial arrangement for defining an annular chamber 7 which serves as a reservoir chamber.

A piston assembly 4 is disposed within the internal space of the inner cylinder tube 3 for dividing the internal space into upper and lower working chambers 14 and 15. The piston assembly 4 is supported on the lower end of a piston rod 6. The piston rod 6 is guided by a rod guide 8 and is engaged in the top end opening of the inner cylinder tube 3. The rod guide 8 cooperates with a piston seal 9 and a stopper plate 10 to form an upper plug assembly for sealingly closing the top ends of the inner and outer cylinder tubes 3 and 2.

The top end of the piston rod 6 is connected to a vehicle body (not shown) in a per se known manner. On the other hand, a connecting eye 32 with an eye busing 31 is provided on the lower end of the outer cylinder tube 2. The outer cylinder tube 2 is connected to a suspension member (not shown) rotatably supporting a road wheel. By this, the shock absorber 1 is disposed between the vehicle body and the suspension member to receive vibration energy causing relative displacement between the vehicle body and the suspension member. The shock absorber 1 is compressed in response to a bounding stroke motion, in which the vehicle body and the suspension member are shifted to approach toward each other, and expanded in response to a rebounding stroke motion, in which the vehicle body and suspension member are shifted away from each other. In response to the bounding stroke motion of the vehicle body and the suspension member, the piston assembly 4 strokes in a compression stroke direction while compressing the lower working chamber 15. This causes an increase of working fluid pressure in the lower working chamber and a decrease of the working fluid pressure in the upper working chamber. On the other hand, in response to the rebounding stroke motion of the vehicle body and the suspension member the piston assembly 4 strokes in an expansion stroke direction while compressing the upper working chamber 14. Therefore, the fluid pressure in the upper working chamber 14 is increased and the fluid pressure in the lower working chamber 15 is decreased. The fluid reservoir chamber 7 is normally maintained at a pressure substantially corresponding to the fluid pressure in the lower working chamber 15.

The lower end opening of the inner cylinder 3 is closed by a bottom valve assembly 5 which defines a communication path 11. The bottom valve assembly 5 thus establishes fluid communication between the fluid reservoir chamber 7 and the lower working chamber 15.

The piston assembly 4 accompanies an expansion valve 16 which is effective in a piston expansion stroke to produce a damping force. The expansion valve 16 is associated with a bias spring 17 which is active on the expansion valve 16 to constantly bias the latter in an upward direction. The bias spring is mounted on the lower end of the piston rod 6 by means of an adjuster nut 18 and a lock nut 19. An adjuster nut 20 also engages with the lower end of the piston rod 6.

The bottom valve assembly 5 has a check valve 21 associated with a port 22 for openably closing the port. The check valve 21 is designed to open during a piston expansion stroke to permit fluid flow from the reservoir chamber 7 to the lower working chamber 15. The bottom valve assembly 5 is also provided with a compression valve 23 which is associated with the lower end of an orifice 24 to open in response to a compression stroke in order to establish fluid communication from the lower working chamber 15 to the reservoir chamber 7. The check valve 21 and the compression valve 23 are mounted and secured on a bottom valve body 12 by means of a clamping pin 26. A stopper plate 25 is also mounted on the bottom valve body 12 in order to restrict the magnitude of opening of the check valve 21. With the shown construction, the check valve 21 is responsive to the pressure difference between the lower working chamber 15 and the fluid reservoir chamber 7 to be shifted to the open position for introducing the working fluid in the fluid reservoir chamber into the lower working chamber. On the other hand, during a piston compression stroke, a pressure difference between the lower working chamber 15 and the fluid reservoir chamber 7 is created to shift the compression valve 23. By opening the compression valve 23, a limited flow rate of the working fluid is permitted to flow from the lower working chamber 15 to the fluid reservoir chamber 7 while generating a damping force.

A rebounding stopper 28 which is made of an elastic material, such as a rubber, is mounted on the piston rod 6 by means of a retainer 27. The rebounding stopper 28 protects the piston assembly 4 from direct collision onto the lower end of the rod guide 8.

The stopper plate 10 is clamped onto the upper end of the outer cylinder tube 2. The stopper 10 defines a center opening 10a, through which the piston rod 6 extends. A rubber busing (not shown) engages with the periphery of the center opening 10a of the stopper plate 10 for slidingly and sealingly guiding the piston rod 6. A main lip 29 and a dust lip 30 are also provided in the upper plug assembly. The main lip 29 sealingly contacts the outer periphery of the piston rod 6 for establishing a fluid tight seal. On the other hand, the dust lip 30 is provided in the vicinity of the stopper plate 10 and contacts with the outer periphery of the piston rod 4 to establish a fluid tight seal so as to prevent the incursion of muddy water, dust and so forth.

The piston assembly 4 is designed to vary damping characteristics to generate a damping force in response to vibration input according to variable characteristics in a different damping mode. In order to control the damping mode of the piston assembly 4, a control unit 100 is connected to the piston assembly 4 via a harness 35 which extends through the piston rod 6.

Figure 2:
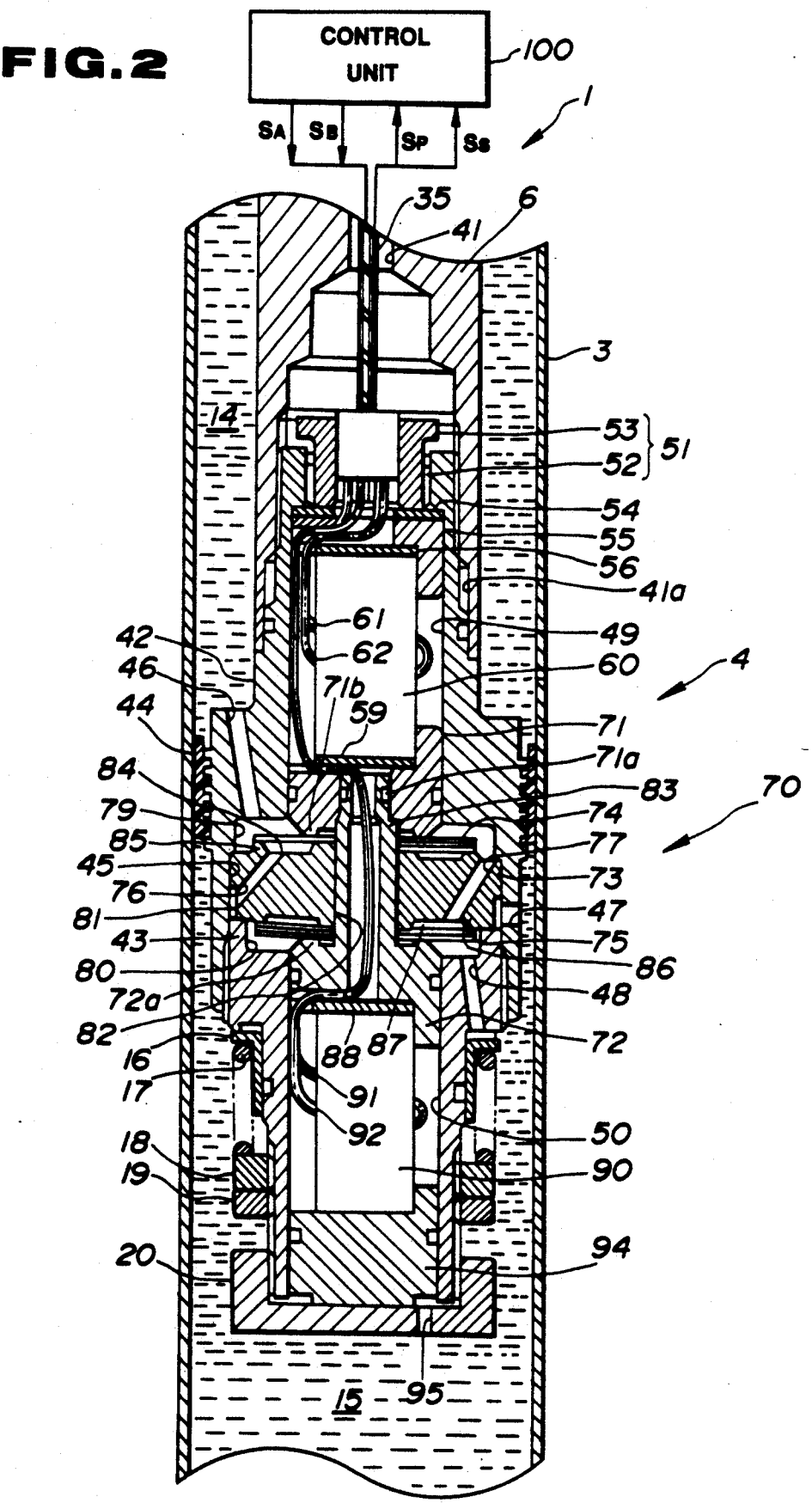
FIG. 2 is an enlarged section of the major part of the preferred embodiment of the variable damping force shock absorber, according to the invention.

FIG. 2 shows the detailed construction of the piston assembly 4 employed in the preferred embodiment of the shock absorber 1 of FIG. 1. As seen, the piston rod 6 defines an axially-extending through opening 41 through which the wiring harness 35 extends. The lower end of the through opening 41 is communicated with a threaded groove 41a forming a piston receptacle. The piston assembly 4 includes a piston body 42 which has an upward extension which threadingly engages with the threaded groove 41a of the piston rod 6 so that the piston body 42 is firmly mounted on the lower end of the piston rod 6. The piston body 42 has an outer periphery mating with the inner periphery of the inner cylinder 3. A low friction seal member 44 which is made of a low friction material, such as a Teflon brand material, engages on the outer periphery of the piston body 42 for establishing the fluid tight seal between the inner periphery of the inner cylinder 3. The piston body 42 has a threaded lower end, to which the upper end of a sleeve 43 engages. The aforementioned adjusting nut 18, the lock nut 19 and the adjusting nut 20 are engaged onto the outer periphery of the lower end portion of the sleeve 43.

The piston body 42 defines an internal space 45 which is in communication with the upper and lower working chambers 14, 15 via communication paths 46 and 47 defined therethrough. On the other hand, the sleeve 43 defines a through opening 48 for communication between the internal space 45 and the lower working chamber 15. The expansion value 16 is associated with the end of the through opening 48 opening to the lower working chamber 15 so as to restrict fluid flow path area for generating a damping force. The expansion valve 16 is responsive to a fluid pressure overcoming the spring force of the bias spring 17 to widen the path area for performing a pressure relieving function.

The assembly of the piston body 42 and the sleeve 43 defines first and second chambers 49 and 50 of essentially circular cross section. These first and second chambers 49 and 50 have a smaller diameter than the space 45 and are communicated with the latter. A first piezoelectric element 60 is disposed within the first chamber 49. The first piezoelectric element 60 has an upper section associated with an adjusting mechanism 51. The adjusting mechanism 51 comprises an adjuster screw 53 engaging with a female thread 52 formed on the inner periphery of the top end of the piston body 42. The adjuster nut 53 has a lower end coupled with an upper end plate 56 fixed onto the upper end of the piezoelectric element 60 via a contact plate 54 and a cap 55. The adjuster screw 53 is manually rotatable for axial shifting to cause axial displacement of the piezoelectric element 60. The piezoelectric element 60 is associated with a slider member 71 via a lower end plate 59.

Similarly, a second piezoelectric element 90 is disposed within the second chamber 50. The second piezoelectric element 90 is supported within the second chamber by means of a cap 94 and the adjuster nut 20, so that the axial position thereof can be adjusted by means of the adjusting nut. The upper end of the second piezoelectric element 90 is associated with a valve core 72 via an upper end plate 88.

The slider 71 and the valve core 72 are associated with a valve body 73 to form a damping mode control mechanism 70. As seen, the valve body 73 is disposed within the space 45 to define therein upper and lower annular chambers 79 and 80. The valve body 73 further defines an annular chamber 81 defined between the outer periphery of the valve body 73 and the inner periphery of the piston body 42. The upper annular chamber 79 is in communication with the upper working chamber 14 via a communication path 48. On the other hand, the lower annular chamber 80 is in communication with the flow working chamber 15 via the through opening 48. The annular chamber 81 is in communication with the lower working chamber 15 with the fluid path 47. The valve body 73 defines a center opening 82 through which an upper cylindrical section 83 of the valve core 72 extends, and communication orifices 76 and 77. The communication orifice 76 opens to an annular groove 84 formed on the upper surface of the valve body and surrounded by an annular land 85. The annular groove 84 is exposed to the upper annular chamber 79. The communication orifice 76 also opens to the annular chamber 81. On the other hand, the communication orifice 77 opens to an annular groove 87 formed on the lower surface of the valve body 72 and surrounded by an annular land 86. The annular groove 86 is exposed to the lower annular chamber 80. The communication orifice 77 also opens to the upper annular chamber 79.

Upper and lower valve members 74 and 75 are provided for openably closing the annular grooves 84 and 87 and thereby blocking fluid communication between the annular grooves and the associated annular chambers 79 and 80. The valve members 74 and 75 comprise leaf springs resiliently deformable in response to the pressure exerted thereto. Normally, the valve members 74 and 75 are supported at the center boss sections projecting at the center portion of the valve body. At this position, the lever length of the valve members 74 and 75 is relatively large to have an initial stiffness to cause resilient deformation in response to the fluid pressure exerted thereto. On the other hand, when the annular projections 71b and 72a of the slider 71 and the valve core 72 are active on the valve members 74 and 75 when the slider and valve cores are operated by the effect of the piezoelectric elements 60 and 90, the lever lengths of the valve members are reduced to increase stiffness for generating a greater damping force in response to vibration input. In the following discussion, the damping mode where the valve members 74 and 75 operate in smaller stiffness, in which the annular projections 71b and 72 of the slider and valve core are not active, will be referred to as a SOFT mode. On the other hand, the damping mode where the annular projections are active to increase stiffness, will be hereafter referred to as a HARD mode.

It should be noted that the valve members 74 and 75 can comprise a plurality of thin disc-shaped relief springs for resilient deformation in response to the fluid pressure exerted thereonto.

As seen from FIG. 2, the first and second piezoelectric elements 60 and 90 are connected to the control unit 100 via cables 61, 62, 91 and 92 which form the wiring harness. As can be clearly seen from FIG. 4, the cables 61 and 91 connect respectively associated piezoelectric elements 60 and 90 to the ground. On the other hand, the cables 62 and 92 connect the piezoelectric elements 60 and 90. Each of the piezoelectric elements 60 and 90 comprises a plurality of thin disc-shaped piezoelectric plates piled up in series. Each of the piezoelectric plates respectively has a pair of electrodes. As is well known, a voltage is applied to such piezoelectric plates to cause electrodistortion to expand and contact the axial length. The magnitude of electrodistortion is variable depending upon the magnitude of voltage applied to the piezoelectric plates. Such electrodistortion may cause mechanical distortion of the piezoelectric element to cause variation of the axial length.

On the other hand, when the fluid pressure is applied to the piezoelectric elements 60 and 90, each of the piezoelectric plates as the components of the piezoelectric elements is caused mechanical distortion for producing an electric power. The magnitude of the electric power to be generated by the piezoelectric elements 60 and 90 is variable depending upon the magnitude of the mechanical distortion and thereby corresponds to the magnitude of the pressure exerted on the piezoelectric elements. In the practical construction, the first piezoelectric element 60 is subject to a fluid pressure of the annular chamber 81 exerted on the valve member 74 which corresponds to the fluid pressure in the lower working chamber 15, via the slider. The first piezoelectric element 60 thus produces a compression mode pressure indicative signal Sp. On the other hand, the second piezoelectric element 90 is subject to fluid pressure in the upper annular chamber 79 exerted on the valve member via the valve member 75 and the valve core 72, which fluid pressure corresponds to that in the upper fluid chamber 14. The second piezoelectric element 90 thus produces an expansion mode pressure indicative signal Ss. As will be appreciated, the magnitude of the compression mode pressure indicative signal Sp and the expansion mode pressure indicative signal Ss are variable depending upon the magnitude of the pressure in the upper and lower working chambers 14 and 15. In addition, in the piston compression stroke, the fluid pressure in the lower working chamber 15 is also exerted on the second piezoelectric element 90 via the adjuster nut 20 and a cap 94. Therefore, even in the piston expansion stroke, the second piezoelectric element 90 outputs the expansion mode pressure indicative signal Ss. Therefore, in the piston expansion stroke, only an expansion mode pressure indicative signal Ss is output from the piezoelectric element 90. On the other hand, in the piston compression stroke, both of the compression mode and expansion mode pressure indicative signals $S_p$ and $S_s$ are output from the first and second piezoelectric elements 60 and 90.

The piezoelectric elements 60 and 90 feed the compression mode pressure indicative signal Sp and the expansion mode pressure indicative signal Ss to the control unit 100. The control unit 100 processes these compression mode and expansion mode pressure indicative signals Sp and Ss to produce an expansion mode control signal $S_A$ and a compression mode control signal $S_B$. The expansion mode control signal $S_A$ is fed to the first piezoelectric element 60 for controlling axial length thereof to adjust the position of the valve core 72 and thereby adjust the stiffness of the valve members 74 and 75. By adjusting the stiffness of the valve member 75, the damping characteristics in response to the piston expansion stroke can be switched between a HARD mode and a SOFT mode. Similarly, the compression mode control signal $S_B$ is applied to the second piezoelectric element 90 for controlling the axial length thereof to adjust the position of the slider 71 relative to the valve members 74 and 75 and thereby adjusts the stiffness of the associated valve member in order to switch the damping mode between the HARD mode and the SOFT mode. By this, the damping characteristics in the piston compression stroke can be adjusted.

Figure 3:
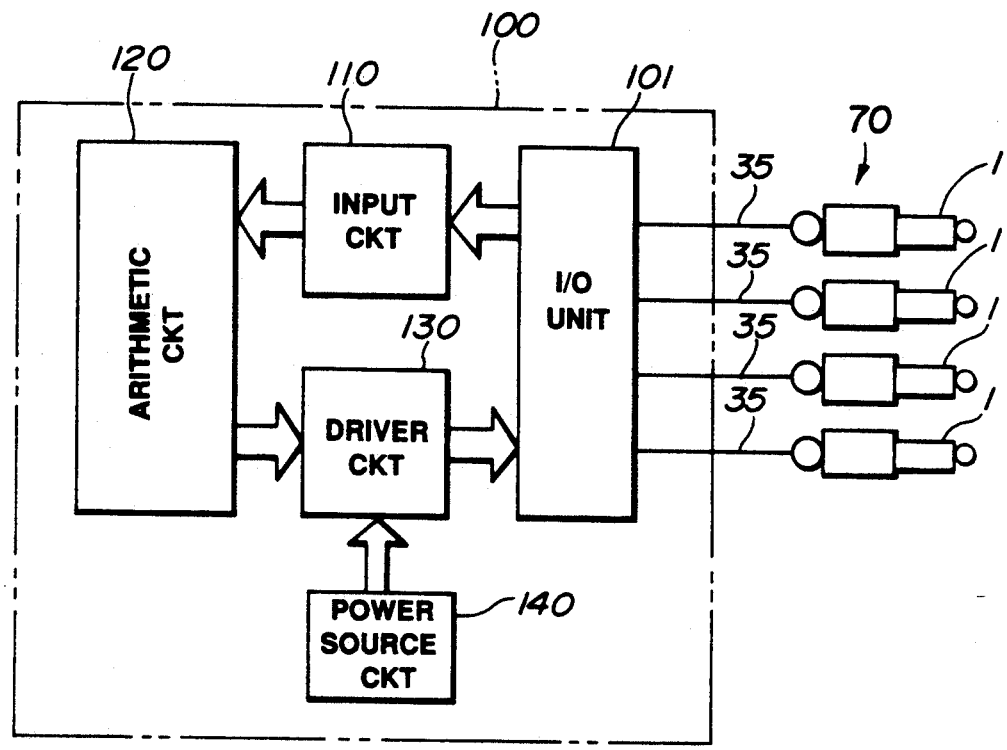
FIG. 3 is a block diagram of the control unit employed in the preferred embodiment of an automotive suspension system and designed for implementing the preferred suspension control process.
Figure 4:
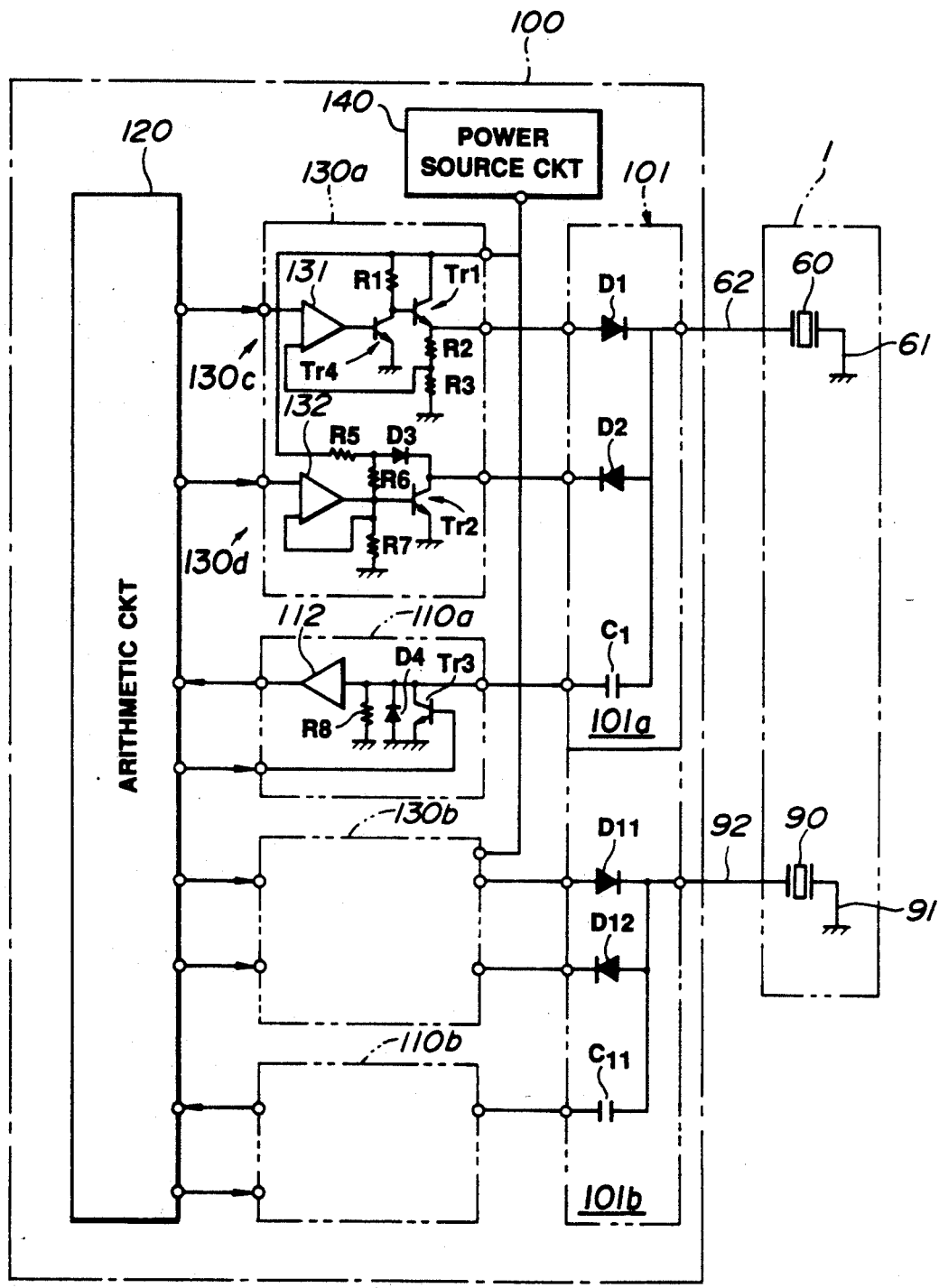
FIG. 4 is a detailed block diagram of the control unit of FIG. 3.

As shown in FIG. 3, the control unit 100 comprises a microprocessor based circuit including an input/output (I/O) unit 101, an input circuit 110, an arithmetic circuit 120, a driver circuit 130 and a driver power source circuit 140. The I/O unit 101 is connected to respective damping control mechanisms 70 of the shock absorbers 1 disposed in front-left, front-right, rear-left and rear-right suspension systems via the cables 62 and 92 of the wiring harnesses 35. The compression mode pressure indicative signals Sp and the expansion mode pressure indicative signals Ss generated by the piezoelectric elements 60 and 90 of respective shock absorbers 1 are input to the control unit 100 through the I/0 unit 101. The I/O unit 101 has a plurality of control channels respectively adapted to control the piezoelectric elements 60 and 90 in respective shock absorbers 1 of front-left, front-right, rear-left and rear-right suspension systems, though FIG. 4 shows only one such shock absorber 1. Each control channel has first and second I/0 sections 101a and 101b for receiving pressure indicative signals Sp and Ss and outputting the control signals $S_A$ and $S_B$. The first control section 101a has a capacitor $C_1$ for receiving the compression mode pressure indicative signal Sp and serving as a filter for removing a direct current noise component in the input signal. The first control section 101a also has a pair of diodes $D_1$ and $D_2$ arranged at opposite polarities.

Similarly, the second control section 101b has a capacitor $C_{11}$ for receiving the expansion mode pressure indicative signal Ss and serving as a filter for removing a direct current noise component in the input signal. The second control section 101b also has a pair of diodes $D_{11}$ and $D_{12}$ arranged at opposite polarities.

The capacitors $C_1$ and $C_{11}$ are connected to first and second sections 110a and 110b of the input circuit 110 respectively. The first section 110a includes a switching transistor $Tr_3$ and an amplifier 112. The switching transistor $Tr_3$ has a base electrode connected to one output terminal of the arithmetic circuit 120 to receive therefrom a selector command. The transistor $TR_3$ has a collector electrode connected to a junction between the capacitor $C_1$ of the I/0 unit 101a and the amplifier 112. The emitter electrode of the switching transistor $Tr_3$ is grounded. In addition, the first section 110a includes a diode $D_4$ and a resistor $R_8$. With the shown construction, the selector command is normally held OFF to input a LOW level command to the base electrode of the switching transistor $Tr_3$. Therefore, the switching transistor $Tr_3$ is normally held OFF to break a connection between the junction and the ground. At this position, the compression mode pressure indicative signal Sp is fed to the amplifier 112 and subsequently to the arithmetic circuit 120. On the other hand, the switching transistor $Tr_3$ is responsive to the HIGH level selector command to turn ON to establish a grounding circuit for grounding the junction between the capacitor $C_1$ and the amplifier 112. As a result, the compression mode pressure indicate signal Sp from the first piezoelectric element 60 is grounded. Therefore, the input to the arithmetic circuit 120 from the amplifier 112 becomes substantially zero.

It should be appreciated, though FIG. 4 shows a simple block 110b to show the second section of the input circuit 110, the circuit construction and function of the second section 110b are identical to that discussed with respect to the first section 110a.

The driver circuit 130 also includes first and second sections 130a and 130b. The first section 130a of the driver circuit 130 has a control section 130c and a switching section 130d. Both of the control section 130c and the switching section 130d are connected to the arithmetic circuit 120 for receiving the expansion mode control signal $S_A$. The control section 130c has an operational amplifier 131 which compares the expansion mode control signal level $S_A$ with a feedback signal level fed back from the output end via a voltage divider constituted by resistors $R_2$ and $R_3$. As long as the expansion mode control signal level is higher than the feedback signal level, the output level of the operational amplifier 131 outputs a LOW level signal to maintain the input level of a gate electrode of a transistor $Tr_4$ at a LOW level. Therefore, the bias at the collector electrode of the transistor $Tr_4$ becomes HIGH to turn a transistor $Tr_1$ ON. By turning ON the transistor $Tr_1$, the driver voltage is fed to the piezoelectric element 60 to expand the axial length of the latter to switch the damping mode of the damping mode control mechanism 70 from the SOFT mode to the HARD mode.

On the other hand, the switching section 130d also has an operational amplifier 132. The operational amplifier 132 receives the expansion mode control signal $S_A$ and compares the expansion mode control signal level with a reference level which is input from the driver power source circuit via a resistor $R_5$ and a voltage divider constituted by resistors $R_6$ and $R_7$. With this circuit connection, the output of the operational amplifier 132 is maintained at a LOW level to maintain a switching transistor $Tr_2$ at non-conductive state for blocking communication between the diode $D_2$ and the ground while the input level from the arithmetic circuit 120 stays lower than a reference level input from the voltage divider of the resistors $R_6$ and $R_7$. It should be noted that the reference level is determined by the resistances of the resistors $R_6$ and $R_7$, which reference level is set at a level corresponding to a predetermined initial stress level to exert on the first piezoelectric element 60. On the other hand, when the expansion mode control level $S_A$ from the arithmetic circuit is higher than or equal to the reference level, the output level of the operational amplifier 132 turns into HIGH level to turn the transistor $Tr_2$ ON. As a result, the diode $D_2$ is connected to the ground via the transistor $Tr_2$. Therefore, the voltage signal as the driver voltage on the cable 62 is grounded so that the expansion mode control signal voltage $S_A$ applied to the first piezoelectric element 60 can be discharged. The transistor $Tr_2$ is maintained in a conductive state until the potential at the first piezoelectrical drops to the initial level, at which the input level from the arithmetic circuit is lowered across the reference level.

Figure 5:
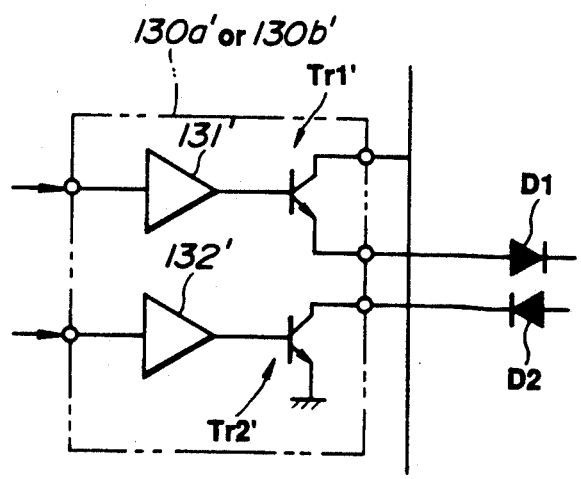
FIG. 5 is a circuit diagram of the simplified modification of an output circuit in the control unit.

It should be noted while the shown construction employs a specific circuit construction to implement the desired mode switching operation for switching an operational mode of the first piezoelectric element 60 between a sensor mode for monitoring the fluid pressure in the lower working fluid chamber 15 and an actuator mode for controlling a damping mode, it is possible to employ a different construction of the circuit. For example, as shown in FIG. 5, each of the output circuits 130a' and 130b' can comprise a pair of buffer amplifier 131' and 132' and transistors $Tr_1'$ and $Tr_2'$. In such case the arithmetic circuit 120 selectively feeds the expansion mode control signal $S_A$ for the buffer amplifiers 131' and 132'. Namely, while the harder damping characteristic is to be ordered, the arithmetic circuit 120 feeds the expansion mode control signal $S_A$ to the buffer amplifier 131' to turn the transistor $Tr_1'$ conductive to apply controlled voltage of the expansion mode control signal. On the other hand, in order to lower damping characteristics, the expansion mode control signal is fed to the buffer amplifier 132' to make the transistor $Tr_2$ ON to complete a grounding circuit for discharging the control signal voltage applied to the first piezoelectric element 60.

As will be seen herefrom, the piezoelectric element 60 acting for monitoring the fluid pressure level in the lower working chamber 15, the capacitor $C_1$ of the first section 101a of the I/0 unit 101, the first section 110a, the arithmetic circuit 120, the second section 130b of the output circuit and pair of diodes $D_{11}$ and $D_{12}$ of the second section 101b of the I/0 unit 101, and the piezoelectric element 90 acting for adjusting the damping mode of the damping mode control mechanism 70 form a compression mode control channel. On the other hand, the second piezoelectric element 90 acting for monitoring the fluid pressure level in the upper working chamber 14, the capacitor $C_{11}$ of the second section 101b of the I/0 unit 101, the second section 110b, the arithmetic circuit 120, the second section 130a of the output circuit and pair of diodes $D_1$ and $D_2$ of the first section 101a of the I/0 unit 101, and the piezoelectric element 60 acting for adjusting the damping mode of the damping mode control mechanism 70 form an expansion mode control channel.

In order to initially set the piezoelectric elements 60 and 90, adjustment is performed by means of the adjuster nuts 53 and 20. Namely, a predetermined voltage is applied for respective piezoelectric elements 60 and 90. At this position, the adjusted nuts 53 and 20 are rotated to adjust stress to be exerted on the piezoelectric elements 60 and 90. This adjustment is continued until the outlet levels of the piezoelectric elements 60 and 90 become a predetermined level.

The operation to be performed in the preferred embodiment of the suspension system will be discussed herebelow with reference to FIGS. 6 to 8.

As shown in FIG. 6(c), the fluid pressure in the upper working chamber 14 is monitored by the second piezoelectric element 90 during the piston expansion stroke. The piezoelectric element 90 thus produces the expansion mode pressure indicative signal Ss. At this time, since the output first piezoelectric element 60 is maintained at a zero level (neutral position), discrimination can be made that the piston is in the expansion stroke. Discrimination is made by the arithmetic circuit 120 in the control unit 100. Then, the arithmetic circuit 120 performs an arithmetic operation to derive a variation rate of the expansion mode pressure indicative signal Ss. The variation rate of the pressure indicative signals Ss and Sp is shown in FIGS. 6(b) and 6(c). When the variation rate reaches a predetermined value, the expansion mode control signal ordering harder damping characteristics is output to switch the damping mode from a SOFT mode to a HARD mode, as shown in periods labeled H in FIG. 6(d). The damping mode is switched back to the SOFT mode from the HARD mode when the variation rate decreases across a zero level.

On the other hand, during the piston compression stroke, the fluid pressure in the lower working chamber 15 is monitored by both of the first and second piezoelectric elements 60 and 90. The first piezoelectric element 60 then produces the compression mode pressure indicative signal Sp. At the same time, the second piezoelectric element 90 produces the expansion mode pressure indicative signal Ss. Therefore, judgement is then made that the piston is in the compression stroke by the arithmetic circuit 120. Therefore, the arithmetic circuit 120 calculates a variation rate of the compression mode pressure indicative Sp. When the variation rate derived on the basis of the compression mode pressure indicative signal Sp reaches the predetermined value, the compression mode control signal $S_B$ is output to the second piezoelectric element 90 to switch the damping mode from the SOFT mode to the HARD mode. Similarly to the expansion mode, the damping mode will be switched back to the SOFT mode when the variation rate decreases across a zero level.

FIG. 7 shows a flow chart showing an operation performed in the arithmetic circuit. Immediately after starting execution, the expansion mode pressure indicative signal Ss and the compression mode pressure indicative signal Sp are read out at a step P1. Based on the read out pressure indicative signals Ss and Sp at the step P1, a frequency data F of the bounding and rebounding strokes of the piston is derived at a step P2. Thereafter, the frequency data F is compared with a predetermined frequency threshold $F_{ref}$ which is set at a criterion between low and high frequency ranges of the bounding and rebounding motions at a step P3. By comparing the frequency data F with the frequency threshold $F_{ref}$ at the step P3, the vibration mode can be discriminated between a high frequency mode and a low frequency mode. Generally high frequency mode vibration is induced by undulation on the road surface and thus is to be effectively absorbed for assuring vehicular riding comfort. On the other hand, low frequency mode vibration is induced due to attitude change of vehicular body or relatively large undulation on the road surface. In the latter case, the vibration is to be effectively damped for assuring vehicular driving stability rather than the vehicular riding comfort.

Therefore, when the frequency data F as checked at step P3, is found greater than or equal to the frequency threshold, discrimination is made for the piston stroke direction on the basis of the read expansion mode pressure indicative signal Ss and the compression mode pressure indicative signal Sp. As set forth, the piston expansion stroke is detected when the read compression mode pressure indicative signal Sp is held at zero. On the other hand, when the compression mode pressure indicative signal Sp is greater than zero, the piston compression stroke is detected. The arithmetic circuit 120 thus selects one of the expansion mode pressure indicative signal Ss and the compression mode pressure indicative signal Sp. Then, at a step P4, a variation rate $\Delta P$ is derived on the basis of the selected one of the expansion mode pressure indicative signal Ss and the compression mode pressure indicative signal Sp. Practically the variation rate $\Delta P$ is calculated by differentiating the selected one of the pressure indicative signals Ss and Sp.

Here, the variation rate $\Delta P$ of the pressure to be exerted on the first and second piezoelectric elements 60 and 90 becomes maximum at the initial space of the piston expansion and compression stroke and becomes a minimum (zero) at the peak of vibration. On the other hand, the piston stroke speed becomes higher according to an increasing piston stroke and according to a shortening vibration cycle period. Therefore, by monitoring the variation rate $\Delta P$, the magnitude of the input vibration can be detected for quicker response. This may provide higher response characteristics to the input vibration in controlling the suspension mode.

At a step P5, the peak of the variation rate $\Delta P$ is detected When the peak of the variation rate $\Delta P$ is detected as checked at the step P5, one of the expansion mode control signal $S_A$ or the compression mode control signal $S_B$ is output to the corresponding one of the first and second piezoelectric elements 60 and 90 depending upon the discriminated piston stroke direction at a step P6. Then, at a step P7, the voltage level of the expansion mode control signal $S_A$ or the compression mode control signal $S_B$ output at the step P6, is checked whether the voltage level is higher than or equal to a voltage threshold level $V_{ref}$. The voltage threshold level $V_{ref}$ is set at a minimum voltage for causing distortion in the corresponding one of the first and second piezoelectric elements 60 or 90 in order to switch a damping mode from the SOFT mode to the HARD mode. Unless the control signal voltage level as checked at the step P7 becomes higher than or equal to the voltage threshold $V_{ref}$, the process returns to the step P6. The steps P6 and P7 are repeated until the control signal voltage level becomes higher than or equal to the minimum voltage level for driving the associated one of the first and second piezoelectric elements 60 and 90. When the control signal voltage level becomes higher than or equal to the voltage threshold level $V_{ref}$ as checked at the step P5, then the process goes to an END.

Though the shown embodiment switches the damping mode between two stages, i.e. the HARD mode and the SOFT mode, it is possible to vary the damping characteristics either or both in the HARD and SOFT mode according to the vibration magnitude. Namely, since the distortion magnitude may essentially be linearly proportion to the voltage applied thereto, a linear or stepless variation of the damping characteristics can be obtained by linearly or steplessly varying the voltage of the control signal. Practically, it may be possible to vary the control signal voltage according to variation of the variation rate $\Delta P$. Furthermore, it may also be possible to determine the control signal voltage corresponding to the peak level of the variation rate $\Delta P$.

On the other hand, the peak of the variation rate $\Delta P$ is not detected as check at the step P5, a check is performed whether it indicates the variation rate is zero, at a step P8. If the variation rate $\Delta P$ is greater than zero as checked at the step P8, process directly goes to END.

On the other hand, when the variation rate $\Delta P$ is zero as checked at the step P8, the switching transistor $Tr_2$ in the corresponding one of the first and second sections 130a and 130b is turned ON to discharge the voltage applied to the piezoelectric element 60 and 90, at a step P9. Then, at a step P10, one of the expansion mode pressure indicative signal Ss and the compression mode pressure indicative signal Sp, which is selected at the step P1, is again checked against a set value $P_{set}$. As long as the checked pressure indicative signal is greater than the set value $P_{set}$ as checked at the step P10, the steps P9 and P10 are repeated to discharge the voltage applied to a corresponding, one of the piezoelectric elements 60 or 90 at a level lower than or equal to the set value $P_{set}$.

On the other hand, if the frequency data F as checked at the step P3 is smaller than the frequency threshold $F_{ref}$ and thus discrimination is made that the vibration mode is a low frequency mode, then the process directly goes to the step P6 for outputting the expansion mode or compression mode control signal $S_A$ or $S_B$ in order to provide hardened suspension characteristics. Therefore, as long as the low frequency mode vibration is maintained, the harder suspension characteristics can be maintained for providing higher vehicular driving stability.

Figure 8A:
FIG. 8 is a timing chart showing control operations of a process of suspension control performed in the preferred embodiment of the suspension system.
Figure 8B:
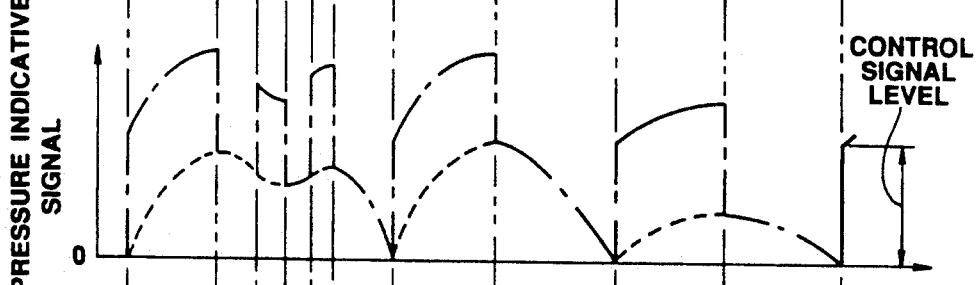
Figure 8C:
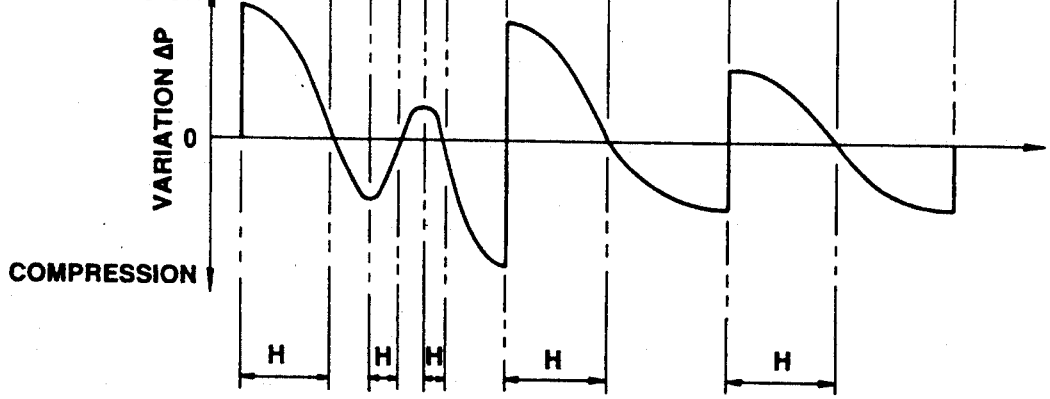

FIG. 8 shows a timing chart showing an example of an operation practically performed in the preferred embodiment of the suspension system according to the present invention. In the shown example, it is assumed that the variation rate $\Delta P$ of the expansion mode pressure indicative signal Ss and the compression mode pressure indicative signal Sp varies as shown in FIG. 8(c). At a point A, the variation rate $\Delta P$ rapidly increased to be greater than or equal to the predetermined value $P_{ref}$. Then, the damping mode is switched from SOFT mode to HARD mode as shown in the period between the point A and a point B. During this period, the pressure indicative signal Ss or Sp is shifted in a magnitude corresponding to the voltage level of the driver signal exerted on the corresponding piezoelectric element, as shown by a one-dotted line in FIG. 8(b). As can be seen from FIG. 8(b), the pressure indicative signal thus varies according to variation of the fluid pressure in the corresponding one of the upper and lower working chambers as shown by a broken line in FIG. 8(b). At the point B, the vibration reaches the peak; thus, the variation rate $\Delta P$ becomes zero. In response to this, the damping mode is switched from the HARD mode to the SOFT mode.

As seen from FIG. 8(a), assuming that the vibration is caused in a rebounding direction to cause an expansion stroke of the piston, the damping force created against the piston expansion stroke is increased by setting the damping mode at the HARD mode as that shown in the period between the point A and the point B. After B, the piston strokes in the compression direction to return to the initial position. In such case, the damping mode is set at the SOFT mode for effectively absorbing the vibration energy as shown in the period between the point B and a point C. At the point C, the variation rate $\Delta P$ in the compression mode reaches a value greater than the predetermined value $P_{ref}$ to again causing switching of the damping mode from the SOFT mode to the HARD mode. Therefore, from the point C to a point D, a greater damping force against the piston stroke is generated. Similarly to the process set forth against the piston stroke is the point B, the variation rate $\Delta P$ becomes zero at the point D. Then, the damping mode is switched into the SOFT mode form the HARD mode. By repeating the foregoing process, the damping modes are switched between the HARD mode and the SOFT mode during the periods between the points D and E, the points E and F, and the points F and G.

As will be appreciated herefrom, since the shown embodiment performs damping mode control in piston expansion and compression strokes independently of each other effective suppression of the piston strokes and an absorption of the vibration energy can be achieved. Furthermore, in the shown embodiment, since the first piezoelectric element 60 is active for detecting fluid pressure in the lower working chamber 15 during the piston compression stroke and the second piezoelectric element 90 is active for adjusting damping mode between the HARD mode and the SOFT mode in the piston compression stroke, and since the second piezoelectric element 90 is active for detecting fluid pressure in the upper working chamber 14 during piston expansion stroke and the second piezoelectric element 60 is active for adjusting damping mode between the HARD mode and the SOFT mode in the piston expansion stroke, monitoring of the fluid pressure and damping mode control can be performed independently at the same time. Therefore, a damping mode control with high precision and high response characteristics can be obtained.

With the shown construction, the present invention successfully achieves both riding comfort and driving stability at a satisfactorily high level.

While the present invention has been disclosed in terms of the preferred embodiment in order to facilitate a better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An automotive suspension system comprising:
   a suspension mechanism disposed between a vehicle body and a suspension member rotatably supporting a road wheel, said suspension mechanism including a shock absorber damping relative movement between said vehicle body and said suspension member, said shock absorber being operative in a shock absorbing mode for absorbing vibration energy and a vibration suppressing mode for resisting against relative motion of said vehicle body and said suspension member;
   a sensor means for monitoring a relative position of said vehicle body and said suspension member for producing a sensor signal representative of a bounding motion stroke and a rebounding motion stroke;
   a controller receiving said sensor signal for discriminating an input vibration mode between a low frequency mode and a high frequency mode which switches across a redetermined vibration frequency criterion, based on frequency of the bounding and rebounding motion, and deriving a suspension control signal ordering said vibration suppressing mode operation of said shock absorber when said low frequency mode vibration is detected, and deriving said control signal selectively ordering said shock absorbing mode and said vibration suppressing mode operations depending upon the relative stroke position of said vehicle body and said suspension member in each cycle of vibration such that said vibration suppressing mode is selected when the stroke direction is directed to a neutral position when said high frequency mode is detected.

2. An automotive suspension system as set forth in claim 1, wherein said shock absorber includes:
   a cylinder tube connected to one of said vehicle body and suspension member and defining an internal space, a piston disposed within said internal space for dividing said internal space into first and second chambers and connected to the other of said vehicle body and said suspension member for relative movement with respect to said cylinder tube, said first and second chambers being filled with a working fluid;
   a fluid communication means for establishing fluid communication between said first and second chambers with a limited fluid flow rate for generating a damping force against relative motion between said piston and said cylinder tube;
   a valve means associated with said fluid communication means for controlling flow restriction of said fluid communication means, said valve means having variable flow restriction characteristics for varying damping characteristics of said shock absorber; and
   an actuating means, associated with said valve means and responsive to a control signal, for controlling said vale means for adjusting said flow restriction characteristics according to said control signal.

3. An automotive suspension system as set forth in claim 1, wherein said sensor means comprises a piezoelectric means producing said sensor signal having a magnitude which is variable depending upon the working fluid pressure exerted thereon.

4. An automotive suspension system as set forth in claim 2, wherein said sensor means comprises a piezoelectric means producing said sensor signal having a magnitude which is variable depending upon the working fluid pressure exerted thereon.

5. An automotive suspension system comprising:
   a suspension mechanism disposed between a vehicle body and a suspension member rotatably supporting a road wheel, said suspension mechanism including a shock absorber damping relative movement between said vehicle body and said suspension member, said shock absorber being operative in a shock absorbing mode for absorbing vibration energy and a vibration suppressing mode for resisting against relative motion of said vehicle body and said suspension member;

a sensor means for monitoring a relative position of said vehicle body and said suspension member for producing a sensor signal representative of a bounding motion stroke and a rebounding motion stroke;

a controller receiving said sensor signal for discriminating an input vibration mode between a low frequency mode and a high frequency mode which switches across a redetermined vibration frequency criterion, based on frequency of the bounding and rebounding motion, and deriving a suspension control signal ordering said vibration suppressing mode operation of said shock absorber when said low frequency mode vibration is detected, and deriving said control signal selectively ordering said shock absorbing mode and said vibration suppressing mode operations depending upon the relative stroke position of said vehicle body and said suspension member when said high frequency mode has been detected;

wherein said shock absorber includes;

a cylinder tube connected to one of said vehicle body and suspension member and defining an internal space, a piston disposed within said internal space for dividing said internal space into first and second chambers and connected to the other of said vehicle body and said suspension member for relative movement with respect to said cylinder tube, said first and second chambers being filled with a working fluid;

a fluid communication means for establishing fluid communication between said first and second chambers with a limited fluid flow rate for generating a damping force against relative motion between said piston and said cylinder tube;

a valve means associated with said fluid communication means for controlling flow restriction of said fluid communication means, said valve means having variable flow restriction characteristics for varying damping characteristics of said shock absorber; and an actuating means, associated with said valve means and responsive to a control signal, for controlling said vale means for adjusting said flow restriction characteristics according to said control signal.

wherein said sensor means comprises a piezoelectric means producing said sensor signal having a magnitude which is variable depending upon the working fluid pressure exerted thereon; and wherein said piezoelectric means further serves as said actuating means.

6. An automotive suspension system comprising:

a suspension mechanism disposed between a vehicle body and a suspension member rotatably supporting a road wheel, said suspension mechanism including a shock absorber damping relative movement between said vehicle body and said suspension member, said shock absorber having variable damping characteristics at least between a harder first characteristic and a softer second characteristic;

a sensor means for monitoring a relative position of said vehicle body and said suspension member for producing a sensor signal representative of a bounding motion stroke and a rebounding motion stroke;

a controller receiving said sensor signal for discriminating an input vibration mode between a low frequency mode and a high frequency mode which switches across a redetermined vibration frequency criterion, based on frequency of the bounding and rebounding motion, and deriving a suspension control signal ordering said first characteristics of said shock absorber when said low frequency mode vibration is detected, and deriving said control signal selectively ordering said first and second characteristics depending upon the relative stroke position of said vehicle body and said suspension member in each cycle of vibration when said high frequency mode is detected.

7. An automotive suspension system comprising:

a suspension mechanism disposed between a vehicle body and a suspension member rotatably supporting a road wheel, said suspension mechanism including a shock absorber damping relative movement between said vehicle body and said suspension member, said shock absorber being operative in a shock absorbing mode for absorbing vibration energy and a vibration suppressing mode for resisting against relative motion of said vehicle body and said suspension member;

a sensor means for monitoring a relative position of said vehicle body and said suspension member for producing a sensor signal representative of a bounding and a rebounding motion stroke, said sensor means being disposed within said shock absorber and monitoring a stroke of the relative position of said vehicle body and said suspension member based on variation of working fluid in said shock absorber and being active in response to a suspension control signal for switching an operational mode of said shock absorber between said vibration suppressing mode and said vibration absorbing mode for causing a variation of flow restriction magnitude for said working fluid in order to operate said shock absorber in commanded operation modes;

a controller receiving said sensor signal for discriminating an input vibration mode between a low frequency mode and a high frequency mode which switches across a predetermined vibration frequency criterion, based on frequency of the bounding and rebounding motion, and deriving a suspension control signal ordering said vibration suppressing mode operation of said shock absorber when said low frequency mode vibration is detected, and deriving said control signal selectively ordering said shock absorbing mode and said vibration suppressing mode operations depending upon the relative stroke position of said vehicle body and said suspension member when said high frequency mode is detected.

8. An automotive suspension system as set forth in claim 7, wherein said sensor means comprises a piezoelectric element.

9. An automotive suspension system comprising:

a suspension mechanism disposed between a vehicle body and a suspension member rotatably supporting a road wheel, said suspension mechanism including a shock absorber damping relative movement between said vehicle body and said suspension member, said shock absorber being operative in a shock absorbing mode for absorbing vibration energy and a vibration suppressing mode for resisting against relative motion of said vehicle body and said suspension member, said shock absorber including:

a cylinder tube connected to one of said vehicle body and said suspension member and defining an internal space, a piston disposed within said internal space for dividing said internal space into first and second chambers and connected to the othef end of said vehicle body and said suspension member for relative movement with respect to said cylinder tube, said first and second chambers being filled with a working fluid;

a fluid communication means for establishing fluid communication between said first and second chambers with a limited fluid flow rate for generating a damping force against relative motion between said piston and said cylinder tube;

a valve means associated with said fluid communication means for controlling flow restriction of said fluid communication means, said valve means having variable flow restriction characteristics for varying damping characteristics of said shock absorber;

an actuating means, associated with said valve means and responsive to a control signal, for controlling said vale means for adjusting said flow restriction characteristics according to said control signal;

a sensor means for monitoring relative position of said vehicle body and said suspension member for producing a sensor signal representative of a bounding and a rebounding motion stroke, said sensor means comprising a piezoelectric means producing said sensor signal having a magnitude which is variable depending upon the working fluid pressure exerted thereon, said piezoelectric means commonly serving as said actuating means of said shock absorber;

a controller receiving said sensor signal for discriminating an input vibration mode between a low frequency mode and a high frequency mode which switches across a predetermined vibration frequency criterion, based on frequency of the bounding and rebounding motion, and deriving a suspension control signal ordering said vibration suppressing mode operation of said shock absorber when said low frequency mode vibration is detected, and deriving said control signal selectively ordering said shock absorbing mode and said vibration suppressing mode operations depending upon the relative stroke position of said vehicle body and said suspension member when said high frequency mode is detected.

10. An automotive suspension system comprising:

a suspension mechanism disposed between a vehicle body and a suspension member rotatably supporting a road wheel, said suspension mechanism including a shock absorber damping relative movement between said vehicle body and said suspension member, said shock absorber being operative in a shock absorbing mode for absorbing vibration energy and a vibration suppressing mode for resisting against relative motion of said vehicle body and said suspension member, said shock absorber incorporating a piezoelectric actuator which is responsive to a suspension control signal for switching between said shock absorbing mode and said vibration suppressing mode;

a sensor means for monitoring relative position of said vehicle body and said suspension member for producing a sensor signal representative of a bounding and a rebounding motion stroke; and a controller receiving said sensor signal for discriminating an input vibration mode between a low frequency mode and a high frequency mode which switches across a predetermined vibration frequency of the bounding and rebounding motion, and deriving a suspension control signal ordering said vibration suppressing mode operation of said shock absorber when said low frequency mode vibration is detected, and deriving aid control signal selectively ordering said shock absorbing mode and said vibration suppressing mode operations depending upon the relative stroke position of said vehicle body and said suspension member when said high frequency mode is detected.

11. An automotive suspension system as set forth in claim 1, wherein said piezoelectric means further serves as said actuating means.

12. An automotive suspension system comprising:

a suspension mechanism disposed between a vehicle body and a suspension member rotatably supporting a road wheel, said suspension mechanism including a shock absorber for damping and absorbing vibration energy which causes relative movement between said vehicle body and said suspension member, said shock absorber operating in a sock absorbing mode for absorbing vibration energy and in a vibration suppressing mode for resisting relative motion between said vehicle body and said suspension member, said shock absorber being variable of operational mode between said shock absorbing mode and said vibration suppressing mode in each individual vibration cycle, in which said shock absorber operates in said vibration suppressing mode in a front half in the individual vibration cycle increasing bounding or rebounding stroke toward the peak and in said shock absorbing mode the latter half past across the peak of the bounding or rebounding stroke and decreasing the bounding or rebounding stroke toward zero;

a sensor means for monitoring a relative position of said vehicle body and said suspension member for producing a sensor signal representative of a bounding motion stroke and a rebounding motion stroke; and a controller receiving said sensor signal for discriminating an input vibration mode between a low frequency mode and a high frequency mode which switches across a predetermined vibration frequency criterion, based on frequency of the bounding and rebounding motion, and deriving a suspension control signal ordering a hard mode for generating greater damping force against vibration energy during the vibration suppressing mode, and a soft mode for generating smaller damping force for absorbing vibration energy during vibration suppressing mode, said controller selectively said hard mode when the detected vibration frequency is lower than said vibration frequency criterion and switching between said soft mode and said hard mode according to stroke position when the detected vibration frequency is higher than said vibration frequency criterion.

13. An automotive suspension system comprising:

a suspension mechanism disposed between a vehicle body and a suspension member rotatably supporting a road wheel, said suspension mechanism including a shock absorber for damping and absorbing vibration energy which causes relative movement between said vehicle body and said suspension member, said shock absorber operating in a shock absorbing mode for absorbing vibration energy and a vibration suppressing mode for resisting relative motion between said vehicle body and said suspension member, said shock absorber being variable of operational mode between said shock absorbing mode and said vibration suppressing mode in each individual vibration cycle, in which said shock absorber operates in said vibration suppressing mode in a front half in the individual vibration cycle increasing bounding or rebounding stroke toward the peak and in said shock absorbing mode the later half past across the peak of the bounding to rebound stroke and decreasing the bounding or rebounding stroke toward zero;

a first sensor means for monitoring a relative position of said vehicle body and said suspension member for producing a first sensor signal varying depending upon stroke direction;

a second sensor means for monitoring a relative position of said vehicle body and said suspension member for producing a second sensor signal varying depending upon stroke direction, said second sensor signal being cooperative with said first sensor signal for representing the direction of vibration stroke in combination; and a controller receiving said first and second sensor signal for discriminating an input vibration mode between a low frequency mode and a high frequency mode which switches across a predetermined vibration frequency criterion, based on frequency of the bounding and rebounding motion, and deriving a suspension control signal ordering a hard mode for generating greater damping force against vibration energy during the vibration suppressing mode, and a soft mode for generating smaller damping force for absorbing vibration energy during vibration suppressing mode, said controller selecting said hard mode when the detected vibration frequency is lower than said vibration frequency criterion and switching between said soft mode said hard mode according to stroke position when the detected vibration frequency is higher than said vibration frequency criterion.

14. An automotive suspension system comprising:

a suspension mechanism disposed between a vehicle body and a suspension member rotatably supporting a road wheel, said suspension mechanism including a shock absorber for damping and absorbing vibration energy which causes relative movement between said vehicle body and said suspension member, said shock absorber operating in a soft mode for absorbing vibration energy and in a vibration suppressing mode for resisting relative motion between said vehicle body and said suspension member; and means for varying the operation of said shock absorber between said shock absorbing mode and said vibration suppressing mode within each individual cycle of bounding and rebounding, said varying means comprising:

sensor means for monitoring a relative position of said vehicle body and said suspension member to produce a sensor signal representative of a bounding motion stroke and a rebounding motion stroke; and controller means responsive to said sensor signal for detecting whether input vibration to the automotive suspension system is in a low frequency mode or a high frequency mode, a boundary between the low frequency mode and the high frequency mode being defined by a predetermined vibration frequency criterion, the input vibration varying across the boundary and, thus, between the low frequency mode and the high frequency mode, and for deriving a suspension control signal ordering a hard mode of shock absorber operation for generating greater damping force against vibration energy during the vibration suppressing mode, and a soft mode of shock absorber operation for generating smaller damping force for absorbing vibration energy during vibration suppressing mode, said controller selecting said hard mode when the detected vibration frequency is lower than said predetermined vibration frequency criterion and switching between said soft mode and said hard mode according to stroke position mode when the detected vibration frequency is higher than said predetermined vibration frequency criterion.

15. An automotive suspension system comprising:

a suspension mechanism disposed between a vehicle body and a suspension member rotatably supporting a road wheel, said suspension mechanism including a shock absorber for damping and absorbing vibration energy which causes relative movement between said vehicle body and said suspension member, said shock absorber operating in a shock absorbing mode for absorbing vibration energy and in a vibration suppressing mode for resisting relative motion between said vehicle body and said suspension member; and means for varying the operation of said shock absorber between said shock absorbing mode and said vibration suppressing mode within each individual cycle of bounding and rebounding, said varying means comprising:

first sensor means for monitoring a relative position of said vehicle body and said suspension member to produce a first sensor signal varying depending upon stroke direction;

second sensor means for monitoring a relative position of said vehicle body and said suspension member to produce a second sensor signal varying depending upon stroke direction, said second sensor signal being cooperative with said first sensor signal to represent in combination the direction of vibration stroke; and controller means responsive to said first and second sensor signals for detecting whether input vibration is in a low frequency mode or a high frequency mode, a boundary between the low frequency mode and the high frequency mode being defined by a predetermined vibration frequency criterion, the input vibration varying across the boundary and, thus, between the low frequency mode and the high frequency mode, and for deriving a suspension control signal ordering a hard mode of shock absorber operation for generating greater damping force against vibration energy during the vibration suppressing mode, and a soft mode of shock absorber operation for generating smaller damping force for absorbing vibration energy during vibration suppressing mode, said controller selecting said hard ode when the detected vibration frequency is lower than said predetermined vibration frequency criterion and switching between said soft mode and said hard mode according to stroke position mode when the detected vibration frequency is higher than said predetermined vibration frequency criterion.

* * * * *